United States Patent
Nishio et al.

(10) Patent No.: US 10,848,646 B2
(45) Date of Patent: Nov. 24, 2020

(54) REPRODUCTION DEVICE, REPRODUCTION METHOD, DISPLAY DEVICE, AND DISPLAY METHOD

(71) Applicant: Panasonic Intellectual Property Management Co., Ltd., Osaka (JP)

(72) Inventors: Toshiroh Nishio, Osaka (JP); Masayuki Kozuka, Osaka (JP); Makoto Serizawa, Osaka (JP); Toshiyuki Fukushima, Osaka (JP); Susumu Miyajima, Osaka (JP); Takeshi Hirota, Osaka (JP); Akihiro Fuke, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/323,615

(22) PCT Filed: Feb. 26, 2018

(86) PCT No.: PCT/JP2018/006855
§ 371 (c)(1),
(2) Date: Feb. 7, 2019

(87) PCT Pub. No.: WO2018/193715
PCT Pub. Date: Oct. 25, 2018

(65) Prior Publication Data
US 2019/0208089 A1  Jul. 4, 2019

Related U.S. Application Data

(60) Provisional application No. 62/488,152, filed on Apr. 21, 2017.

(51) Int. Cl.
*H04N 5/04* (2006.01)
*H04N 21/485* (2011.01)
(Continued)

(52) U.S. Cl.
CPC ............... *H04N 5/04* (2013.01); *G11B 27/10* (2013.01); *H04N 21/242* (2013.01);
(Continued)

(58) Field of Classification Search
None
See application file for complete search history.

(56) References Cited

U.S. PATENT DOCUMENTS

2007/0140656 A1* 6/2007 Ergin ................. H04N 21/8173
386/207
2011/0285906 A1* 11/2011 Takiduka ............ H04N 21/235
348/468

(Continued)

FOREIGN PATENT DOCUMENTS

JP    2016-515327 A    5/2016
WO   2014/130213 A1   8/2014

OTHER PUBLICATIONS

International Search Report issued in Application No. PCT/JP2018/006855 dated May 22, 2018, with English translation.

*Primary Examiner* — Samira Monshi
(74) *Attorney, Agent, or Firm* — McDermott Will & Emery LLP

(57) ABSTRACT

There is provided a reproduction device that outputs a video signal to a display device via predetermined communication, the video signal including a video having pictures and corresponding pieces of image characteristic information. The reproduction device includes: an obtaining unit that obtains a first time difference between a timing at which the display device displays one picture among the pictures and a timing used by the display device to display one of the pieces of image characteristic information corresponding to the one picture; an adjuster that adjusts at least one of a timing at which the pictures are outputted and a timing at which the pieces of image characteristic information are (Continued)

outputted to reduce the first time difference; and an output unit that outputs the pictures and the pieces of image characteristic information via the predetermined communication at the time adjusted by the adjuster.

11 Claims, 12 Drawing Sheets

(51) Int. Cl.
    *H04N 21/43*     (2011.01)
    *G11B 27/10*     (2006.01)
    *H04N 21/242*     (2011.01)
    *H04N 21/435*     (2011.01)
    *H04N 21/422*     (2011.01)

(52) U.S. Cl.
    CPC ....... *H04N 21/42204* (2013.01); *H04N 21/43* (2013.01); *H04N 21/435* (2013.01); *H04N 21/485* (2013.01)

(56) References Cited

U.S. PATENT DOCUMENTS

2016/0005201 A1    1/2016  Kunkel et al.
2016/0104438 A1*  4/2016  Han .................... G09G 3/3413
                                               345/690

* cited by examiner

REPRODUCTION DEVICE, REPRODUCTION METHOD, DISPLAY DEVICE, AND DISPLAY METHOD

RELATED APPLICATIONS

This application is the U.S. National Phase under 35 U.S.C. § 371 of International Application No. PCT/JP2018/006855, filed on Feb. 26, 2018, which in turn claims the benefit of U.S. Provisional Application No. 62/488,152, filed Apr. 21, 2017, the disclosures of which are incorporated by reference herein.

TECHNICAL FIELD

The present disclosure relates to a reproduction device that reproduces image data, a reproduction method, a display device that displays a reproduced image, and a display method.

BACKGROUND ART

PTL 1 discloses a method of receiving metadata on an image and performing appearance mapping of the image according to the received metadata.

CITATION LIST

Patent Literature

PTL 1: Japanese Unexamined Patent Application Publication (Translation of PCT Application) No. 2016-515327

SUMMARY OF THE INVENTION

Technical Problem

The present disclosure provides a reproduction device, and a display device which are capable of performing appropriate display processing on a predetermined picture in a video, the appropriate display processing corresponding to the image characteristics of the predetermined picture.

Solution to Problem

A reproduction device in the present disclosure is a reproduction device that outputs a video signal to a display device via predetermined communication, the video signal including a video having a plurality of pictures and a plurality of pieces of image characteristic information each representing an image characteristic of a corresponding one of the plurality of pictures, the reproduction device including: an obtaining unit that obtains a first time difference between a timing at which the display device displays one picture among the plurality of pictures and a timing used by the display device to display one of the plurality of pieces of image characteristic information corresponding to the one picture; an adjuster that adjusts at least one of a timing at which the plurality of pictures are outputted and a timing at which the plurality of pieces of image characteristic information are outputted to reduce the first time difference obtained by the obtaining unit; and an output unit that outputs the plurality of pictures and the plurality of pieces of image characteristic information via the predetermined communication at the timing adjusted by the adjuster.

A display device in the present disclosure includes: an obtaining unit that obtains a video signal from a reproduction device via predetermined communication, the video signal including a video having a plurality of pictures and a plurality of pieces of image characteristic information each representing an image characteristic of a corresponding one of the plurality of pictures; a detector that detects a third time difference between a timing at which the reproduction device outputs one picture among the plurality of pictures and a timing at which the reproduction device outputs one of the plurality of pieces of image characteristic information corresponding to the one picture; an adjuster that adjusts at least one of a timing at which the plurality of pictures are displayed and a timing used to display the plurality of pieces of image characteristic information according to the third time difference detected by the detector to reduce the third time difference; and a display that displays the plurality of pictures using the plurality of pieces of image characteristic information at the timing adjusted by the adjuster.

These general or specific aspects may be each achieved as a system, a method, an integrated circuit, a computer program, a recording medium such as a computer-readable CD-ROM, or any combination thereof.

Advantageous Effect of Invention

The reproduction device, the display device in the present disclosure are capable of performing appropriate image processing on a predetermined picture in a video, the appropriate image processing corresponding to the image characteristics of the predetermined picture.

DESCRIPTION OF EXEMPLARY EMBODIMENTS

Embodiment

Knowledge Underlying the Present Invention

Figure 1:
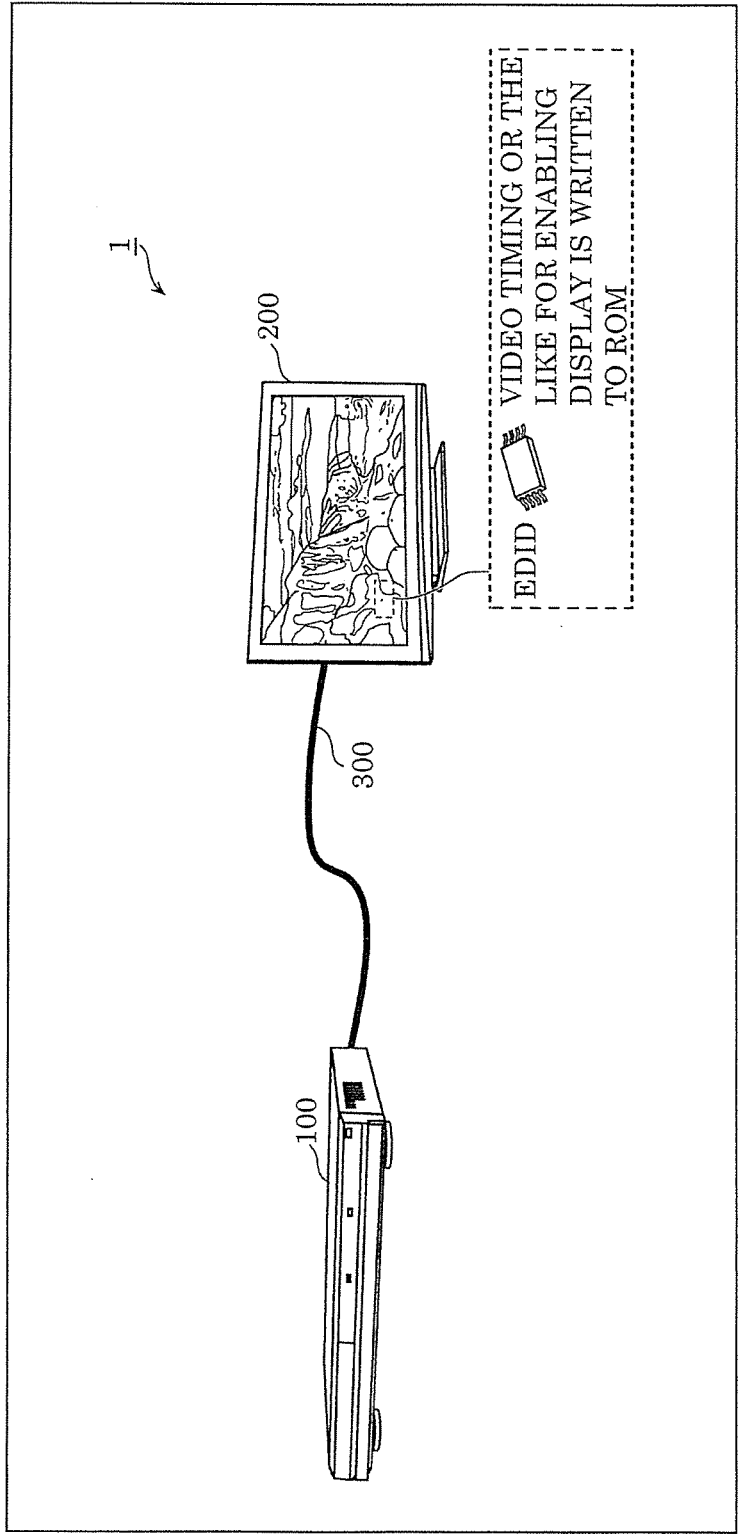
FIG. 1 is a schematic diagram of a video display system according to Embodiment 1.

The inventor has found that the following problems arise regarding the method described in the section of "BACKGROUND ART".

In the method described in PTL 1, processing of an image is performed in accordance with received metadata, thereby displaying an image after the processing. Meanwhile, such metadata includes static metadata that is metadata for performing luminance conversion for each contents, and dynamic metadata that is metadata for performing luminance conversion for each scene of contents or for each picture of contents.

When the display device executes display processing for performing luminance conversion using dynamic metadata, metadata corresponding to the scene or the picture may not be obtainable at the timing of display processing on a scene or a picture of contents. In general, the reproduction device outputs a picture obtained by decoding image data and metadata included in the image data to the display device as a video signal, and the display device executes display processing based on the inputted video signal.

At this point, in the reproduction device, in addition to reading image data from a recording medium, a picture is obtained by performing processing to decode stream data included in the image data, thus obtaining the picture takes more time than obtaining metadata from the image data. For this reason, a picture and metadata having a correspondence relationship may be outputted to the display device with delayed timing.

In the display device, it takes time to perform display processing on the picture in the video signal, thus when display processing using metadata is performed, there is a possibility that the display processing may be applied to another picture different from a picture in corresponding relationship with the metadata.

With the technique in PTL 1, when display processing is performed on a picture in the display device, there is a possibility that display processing may be performed using metadata which has no corresponding relationship with the picture. For instance, there is a problem when a scene is changed in that a picture to which appropriate display processing has not been performed may be displayed.

In order to solve such a problem, the inventor has devised the reproduction device, the reproduction method, the display device, and the display method of the present disclosure.

Hereinafter, an embodiment will be described in detail with reference to the drawings. However, a detailed description more than necessary may be omitted. For instance, a detailed description of well-known matters and a redundant description of substantially the same configuration may be omitted. This is for the purpose of avoiding unnecessarily redundant description below and facilitating understanding of those skilled in the art.

It should be noted that the inventor(s) provide the accompanying drawings and the following description so that those skilled in the art sufficiently understand the present disclosure, and it is not intended to limit the subject matter described in CLAIMS.

Embodiment 1

Hereinafter, Embodiment 1 will be described using FIGS. 1 to 10.

[1-1. Configuration]

FIG. 1 is a schematic diagram of a video display system according to Embodiment 1.

Specifically, FIG. 1 illustrates reproduction device 100, display device 200, and transmission cable 300. For instance, video display system 1 includes reproduction device 100 and display device 200 among these components. Although reproduction device 100 and display device 200 are connected to allow mutual communication by transmission cable 300 in FIG. 1, reproduction device 100 and display device 200 may not be connected by transmission cable 300, and may be connected to allow mutual communication by wireless communication.

Reproduction device 100 obtains image data, decodes the obtained image data, and outputs a video obtained by the decoding and image characteristic information indicating the image characteristics of the video to display device 200. Specifically, reproduction device 100 is a device that obtains image data recorded on a recording medium by reading the recording medium. The recording medium may be an optical disc such as DVD, Blu-ray (registered trademark) Disc (hereinafter also denoted as "BD"), or may be a storage such as a hard disk drive (HDD), a solid state drive (SSD). Reproduction device 100 is a BD player, for instance. Reproduction device 100 may obtain image data via a communication network such as the Internet.

Display device 200 obtains a video signal outputted by reproduction device 100, and executes predetermined display processing on the obtained video signal to display an image represented by the video signal. Display device 200 is a TV, a display, for instance.

Transmission cable 300 is, for instance, HDMI (registered trademark) (High-Definition Multimedia Interface) cable.

In video display system 1, reproduction device 100 transmits InfoFrame to display device 200 via transmission cable 300 during a Blanking period of a video signal. Reproduction device 100 reads EDID of display device 200 via transmission cable 300.

Here, InfoFrame is a packet in which the attributes of a video signal being outputted by reproduction device 100 are written, and is data transmitted during a Blanking period of display device 200. Specifically, InfoFrame includes data such as AVI_InfoFrame (information such as Video timing, RGB/YCbCr, colorimetry), Audio InfoFrame (including Audio information), and Vendor Specific InfoFrame (Vendor specification information classified by IEEE 24 bit code).

The EDID is ROM data for sending display capability information to a Source device such as reproduction device 100, the display capability information indicating a format of displayable image of a Sync device, such as display device 200 in conformity with (that is, compatible with) HDMI. EDID is normally data consisting of 256 bytes. Specifically, the EDID is information (display capability information) indicating manufacturer name, manufacturing year, video timing for display (video timing for display, such as 1080i/60, 720p/60, 480p), supportability of Deep Color, and supportability of 3D. In the embodiment, the EDID further includes time difference information indicating a first time difference between the first timing when display device 200 displays one picture among the multiple pictures and the second timing used by display device 200 to display one of the multiple pieces of image characteristic information corresponding to the one picture.

Figure 2:
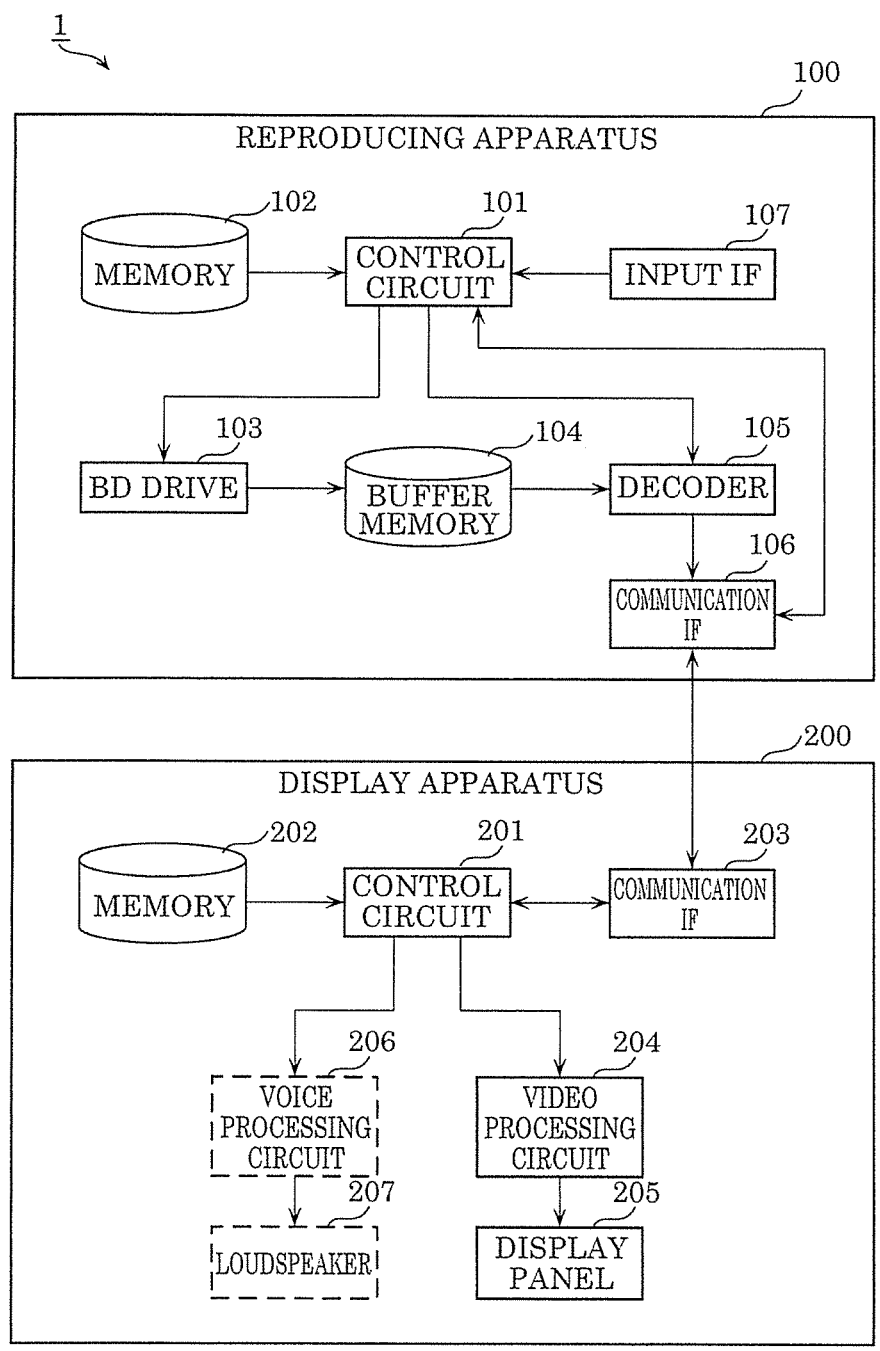
FIG. 2 is a block diagram illustrating an example of a hardware configuration of the video display system according to Embodiment 1.

FIG. 2 is a block diagram illustrating an example of a hardware configuration of the video display system according to Embodiment 1.

First, the hardware configuration of reproduction device 100 will be described.

Reproduction device 100 includes control circuit 101, memory 102, BD drive 103, buffer memory 104, decoder 105, communication interface (IF) 106, and input interface (IF) 107.

Control circuit 101 is a processing circuit that executes a control program stored in memory 102 or the like. Control circuit 101 is a general-purpose processor such as a CPU, for instance. It should be noted that control circuit 101 may be a dedicated communication circuit that executes predetermined processing using memory 102. Control circuit 101 controls the operation of BD drive 103, decoder 105 and others by executing processing according to a control program. Control circuit 101 may cause BD drive 103, decoder 105 and others to execute control according to input received via input IF 107.

Memory 102 is a volatile storage area which is used as a work area when control circuit 101 executes a control program.

BD drive 103 is a device that reads content data currently recorded on optical discs, such as BD. BD drive 103 outputs the read content data to buffer memory 104. It should be noted the content data is data including at least image data, and may also include audio data.

Buffer memory 104 is a volatile storage area that temporarily holds the content data outputted by BD drive 103.

Decoder 105 reads the content data held in buffer memory 104, and decodes the read content data. Decoder 105 outputs a video signal obtained by decoding the content data to communication IF 106, the video signal representing an image. When the content data includes audio data, decoder 105 also outputs an audio signal obtained by decoding the audio data to communication IF 106, the audio signal representing sound.

Communication IF106 is a communication interface for communicating with display device 200. Specifically, communication IF 106 is an HDMI. Communication IF 106 transmits a video signal to display device 200, for instance via transmission cable 300 connected.

Input IF 107 is an input interface that receives input from a user. Specifically, input IF 107 is a receiving unit that receives an infrared signal from a remote controller, for instance. When receiving an infrared signal, input IF107 outputs input information represented by the received infrared signal to control circuit 101. It should be noted that input IF 107 is not limited to a receiving unit that receives an infrared signal, but may be a receiving unit that receives a wireless signal other than an infrared signal. Also, input IF 107 may be a device that receives input to other input devices, such as a mouse, a keyboard, and a touch sensor other than a remote controller.

Next, the hardware configuration of display device 200 will be described.

Display device 200 includes control circuit 201, memory 202, communication interface (IF) 203, video processing circuit 204, display panel 205, audio processing circuit 206, and loudspeaker 207.

Control circuit 201 is a processing circuit that executes a control program stored in memory 202. Control circuits 201 is a general-purpose processor such as a CPU, for instance. It should be noted that control circuit 201 may be a dedicated communication circuit that executes predetermined processing using memory 202. Control circuit 201 controls the processing in video processing circuit 204, audio processing circuit 206 by executing processing in accordance with a control program.

Memory 202 is a volatile storage area which is used as a work area when control circuit 201 executes a control program. Memory 202 may include EDID ROM which stores an EDID.

Communication IF 203 is a communication interface for communicating with reproduction device 100. Specifically, communication IF 203 is an HDMI. Communication IF 203 receives a video signal from reproduction device 100 via transmission cable 300 connected.

Video processing circuit 204 executes predetermined display processing on a video signal, and thereby displays an image represented by the video signal on display panel 205. For each of multiple pictures included in the video signal, video processing circuit 204 performs display processing using image characteristic information corresponding to the picture, thereby displaying the multiple pictures.

Display panel 205 displays an image according to a signal outputted by video processing circuit 204. Display panels 205 is, for instance, a liquid crystal panel, an organic electro luminescent (EL) panel.

Audio processing circuit 206 performs predetermined processing on an audio signal, thereby outputting sound represented by the audio signal from loudspeaker 207.

Loudspeaker 207 outputs a voice according to a signal outputted by audio processing circuit 206.

Control circuit 201, memory 202, video processing circuit 204, and audio processing circuit 206 may be implemented by a processing circuit combining two or more circuits, or may be implemented by a single processing circuit. Control circuit 201, memory 202, video processing circuit 204, and audio processing circuit 206 may be implemented by respective independent processing circuits or may be implemented by a processing circuit in common.

It should be noted that display device 200 does not need to include audio processing circuit 206 and loudspeaker 207.

Figure 3:
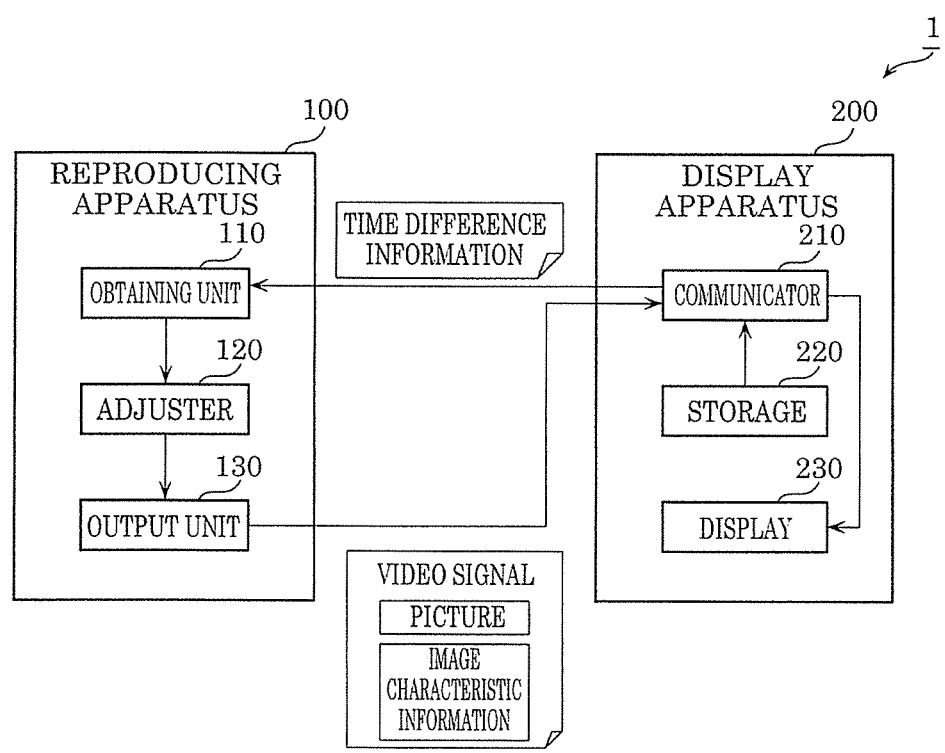
FIG. 3 is a block diagram illustrating an example of a functional configuration of the video display system according to Embodiment 1.

FIG. 3 is a block diagram illustrating an example of a functional configuration of the video display system according to Embodiment 1.

First, the functional configuration of reproduction device 100 will be described.

Reproduction device 100 includes obtaining unit 110, adjuster 120, and output unit 130 as the functional configuration.

Obtaining unit 110 obtains the above-described time difference information from display device 200 via transmission cable 300. Obtaining unit 110 obtains, for instance, EDID, which includes time difference information, of display device 200 via the HDMI, thereby obtaining the time difference information. The first time difference indicating by time difference information is a time difference obtained by subtracting the second timing from the first timing, for instance. That is, when the first timing is a time earlier than the second timing, the first time difference is a positive value, and conversely, when the first timing is time later than the second timing, the first time difference is a negative value. Obtaining unit 110 is implemented by control circuit 101, memory 102, and communication IF 106, for instance.

It should be noted that the first time difference may be the time difference obtained by subtracting the first timing from the second timing. In this case, the relationship between the positive and negative values is reversed.

Adjuster 120 adjusts at least one of the timing at which multiple pictures are outputted and the timing at which multiple pieces of image characteristic information are outputted to reduce the first time difference indicated by the time difference information obtained by obtaining unit 110. Specifically, when the first time difference is a positive value, adjuster 120 delays the timing at which multiple pictures are outputted by the first time difference, or advances the timing at which multiple pieces of image characteristic information are outputted by the first time difference, or delays the timing at which multiple pictures are outputted and advances the timing at which multiple pieces of image characteristic information are outputted by the first time difference. When the first time difference is a negative value, adjuster 120 advances the timing at which multiple pictures are outputted by the first time difference, or delays the timing at which multiple pieces of image characteristic information are outputted by the first time difference, or advances the timing at which multiple pictures are outputted and delays the timing at which multiple pieces of image characteristic information are outputted by the first time difference. Adjuster 120 may adjust the timing in terms of unit of a display interval (display period) of continuously displayed multiple pictures. Adjuster 120 is implemented by control circuit 101, memory 102, for instance.

Output unit 130 outputs multiple pictures and multiple pieces of image characteristic information by predetermined communication at the timing adjusted by adjuster 120. Output unit 130 outputs multiple pictures and multiple pieces of image characteristic information to display device 200, for instance, by communication using HDMI as the predetermined communication.

Hereinafter, predetermined communication is communication using transmission cable 300 of HDMI. However, predetermined communication is not limited to the above-mentioned communication, and may be communication that is performed between communication IF 106 and communication IF 203. Output unit 130 is implemented by control circuit 101, memory 102, communication IF 106, for instance.

The video signal outputted by reproduction device 100 will be described.

Figure 4:
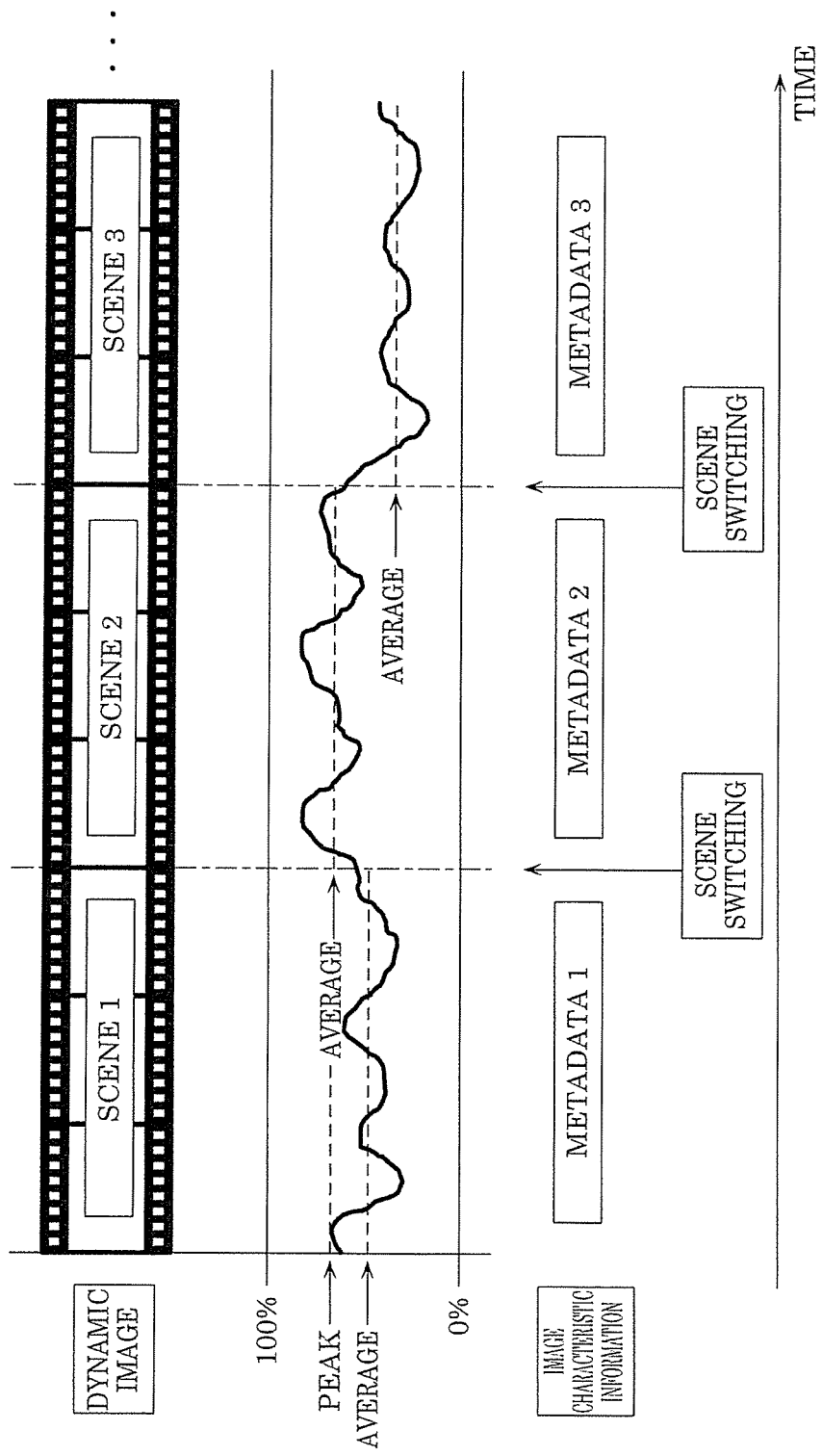
FIG. 4 is a diagram for explaining an example of a video signal.

FIG. 4 is a diagram for explaining an example of the video signal.

As illustrated in FIG. 4. the video signal includes information representing a video and multiple pieces of metadata as multiple pieces of image characteristic information corresponding to respective multiple pictures included in the video. Here, the video includes multiple scenes 1, 2, 3, . . . , and an example of a configuration is given in which multiple scenes 1, 2, 3, . . . are correspondingly provided with metadata 1, 2, 3, . . . . In this case, metadata n corresponding to scene n (n is an integer greater than or equal to one) is the data that indicates at least one of a maximum luminance (peak) and an average luminance in scene n.

Next, the functional configuration of display device 200 will be described.

Display device 200 includes communicator 210, storage unit 220, and display 230 as the functional configuration.

Communication unit 210 transmits the time difference information stored in storage unit 220 to reproduction device 100 via transmission cable 300. Specifically, communicator 210 transmits EDID, which includes time difference information and stored in storage unit 220, to reproduction device 100. Communication unit 210 receives a video signal from reproduction device 100. Communication unit 210 is implemented by control circuit 201, memory 202, communication IF 203, for instance.

Storage unit 220 stores EDID including time difference information. Storage unit 220 is implemented by memory 202, for instance.

Display 230 performs display processing on a picture included in a video signal received by communicator 210, and displays the picture, where image characteristic information corresponding to the picture is applied to the display processing. Display 230 performs display processing using metadata n for the picture of scene n. For the picture of scene n, display 230 may perform tone mapping process as the display processing to adjust the maximum luminance of metadata n to the maximum luminance of display panel 205 of display device 200. In the tone mapping process, display 230 may perform processing using the average luminance of metadata n. Thus, display 230 can perform optimal adjustment according to the luminance of each scene. For instance, when the maximum luminance of a scene is lower than the maximum luminance of the display device, display 230 can display an image with rich gradation of the luminance of the scene, and when the maximum luminance of the scene is higher than the maximum luminance of the display device, display 230 can presents an image in a high luminance area without causing blown out highlights. Display 230 is implemented by video processing circuit 204 and display panel 205, for instance.

[1-2. Operation]

The operation of thus configured video display system 1 will be described below.

Figure 5:
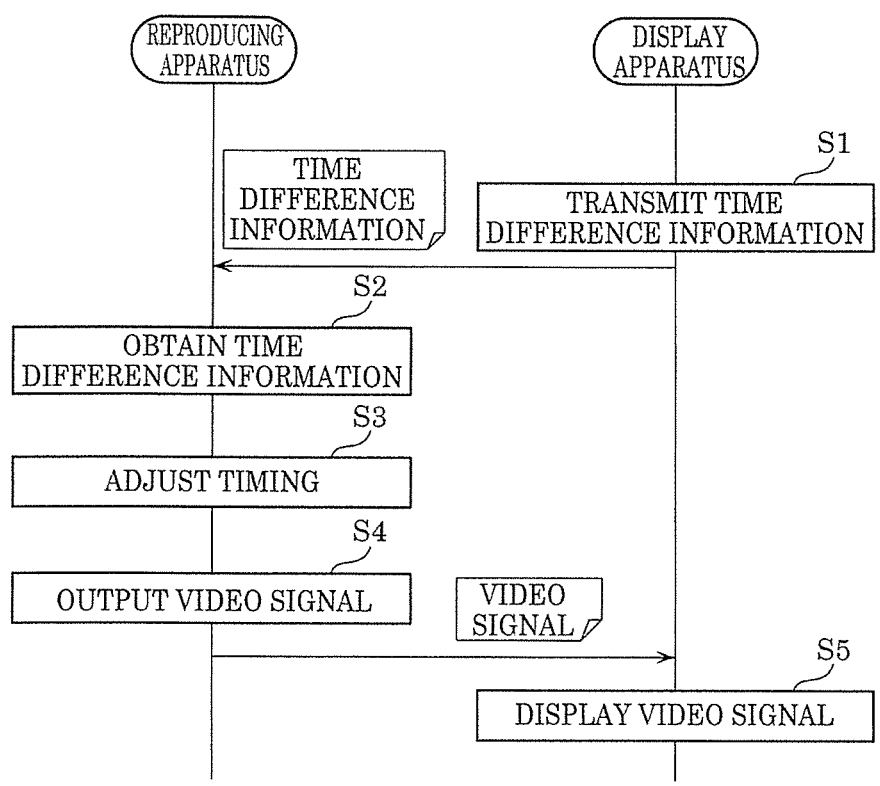
FIG. 5 is a sequence diagram illustrating an example of a reproduction method performed by the video display system according to Embodiment 1.

FIG. 5 is a sequence diagram illustrating an example of a reproduction method performed by the video display system according to Embodiment 1.

First, display device 200 transmits the time difference information stored in memory 202 to reproduction device 100 via transmission cable 300 (S1).

Subsequently, in reproduction device 100, obtaining unit 110 obtains time difference information from display device 200 (S2). Specifically, reproduction device 100 receives EDID of display device 200 from display device 200, thereby obtaining the time difference information included in the EDID.

Adjuster 120 adjusts at least one the timing at which multiple pictures are outputted and the timing at which multiple pieces of image characteristic information are outputted to reduce the first time difference indicated by time difference information obtained by obtaining unit 110 (S3).

Subsequently, output unit 130 outputs the multiple pictures and the multiple pieces of image characteristic information via transmission cable 300 at the timing adjusted by adjuster 120 (S4).

Display device 200 receives a video signal via transmission cable 300, the video signal including the multiple pictures and the multiple pieces of image information outputted from reproduction device 100, and displays the received video signal (S5).

[1-3. Effect]

As described above, in the embodiment, reproduction device 100 outputs a video signal to display device 200 via transmission cable 300, the video signal including a video having multiple pictures and multiple pieces of image characteristic information corresponding to the multiple pictures and representing respective image characteristics of the multiple pictures. Reproduction device 100 includes obtaining unit 110, adjuster 120, and output unit 130. Obtaining unit 110 obtains a first time difference between the timing when display device 200 displays one picture among the multiple pictures and the timing used by the display device to display one of the multiple pieces of image characteristic information corresponding to the one picture. Adjuster 120 adjusts at least one of the timing at which the multiple pictures are outputted and the timing at which the multiple pieces of image characteristic information are outputted to reduce the first time difference obtained by obtaining unit 110. Output unit 130 outputs the multiple pictures and the multiple pieces of image characteristic information via transmission cable 300 at the timing adjusted by adjuster 120.

According to this, reproduction device 100 adjusts at least one of the timing at which the multiple pictures are outputted and the timing at which the multiple pieces of image characteristic information are outputted to reduce the first time difference between the timing at which display device 200 displays a picture and the timing used by display device 200 to display image characteristic information corresponding to the picture. Reproduction device 100 outputs the multiple pictures and the multiple pieces of image characteristic information at the adjusted timing. Thus, at the timing at which processing to display a predetermined picture of the video is performed, display device 200 can obtain image characteristic information corresponding to the predetermined picture. Therefore, appropriate display processing for the image characteristics of a predetermined picture of the video can be performed on the predetermined picture.

In the embodiment, the predetermined communication is communication via High-Definition Multimedia Interface (HDMI). Obtaining unit 110 obtains Extended Display Identification Data (EDID) of display device 200 via HDMI, thereby obtaining the first time difference included in the EDID. Therefore, reproduction device 100 can obtain the first time difference only by connecting to display device 200 via the HDMI.

In the embodiment, multiple pieces of image characteristic information are dynamic metadata that includes at least one of the maximum luminance and the average luminance of the multiple pictures. Therefore, display device 200 can perform display processing to which dynamic metadata is applied on a predetermined picture at an appropriate timing.

[1-4. Modification]

[1-4-1. Modification 1]

Modification 1 of Embodiment 1 will be described.

Figure 6:
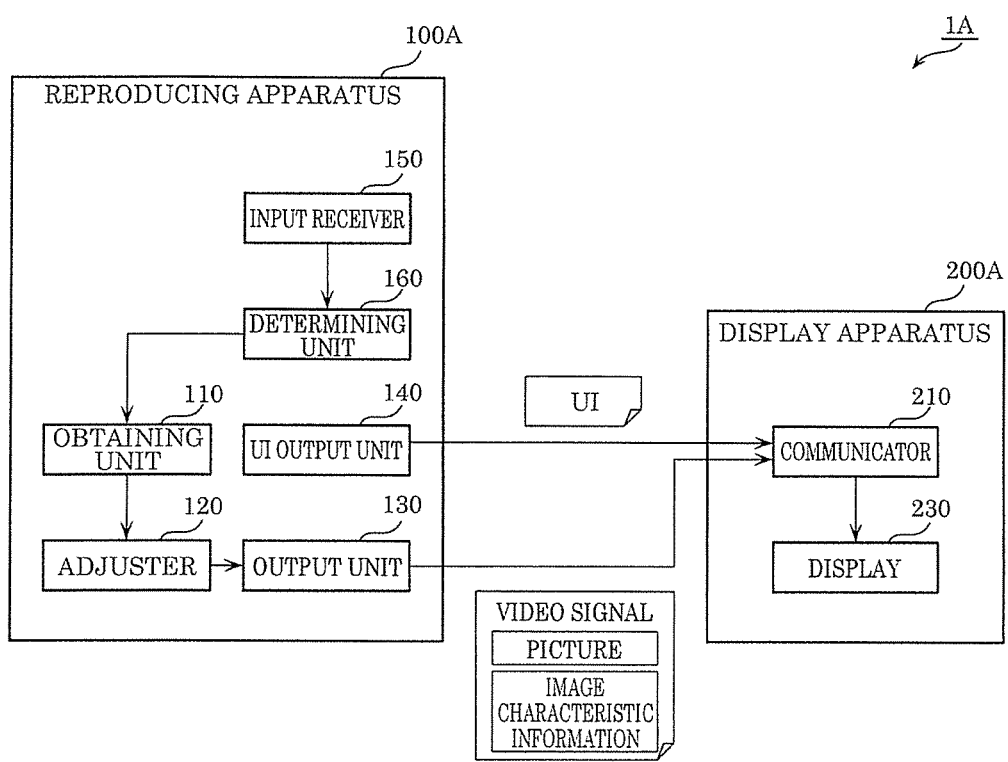
FIG. 6 is a block diagram illustrating an example of a functional configuration of a video display system according to Modification 1 of Embodiment 1.

FIG. 6 is a block diagram illustrating an example of a functional configuration of a video display system according to Modification 1 of Embodiment 1.

In video display system 1A according to Modification 1 of Embodiment 1, the functional configuration of reproduction device 100A is different from the functional configuration of reproduction device 100 of Embodiment 1. The functional configuration of display device 200A according to Modification 1 of Embodiment 1 is also different from the functional configuration of display device 200 of Embodiment 1. Hereinafter, a different point from video display system 1 of Embodiment 1 will be described, and a description of a common configuration is omitted. The hardware configuration of reproduction device 100A is the same as that of reproduction device 100 of Embodiment 1, and the hardware configuration of display device 200A is the same as that of display device 200 of Embodiment 1.

As compared with reproduction device 100 of Embodiment 1, reproduction device 100A further includes user interface (UI) output unit 140, input receiver 150, and determining unit 160.

Figure 7:
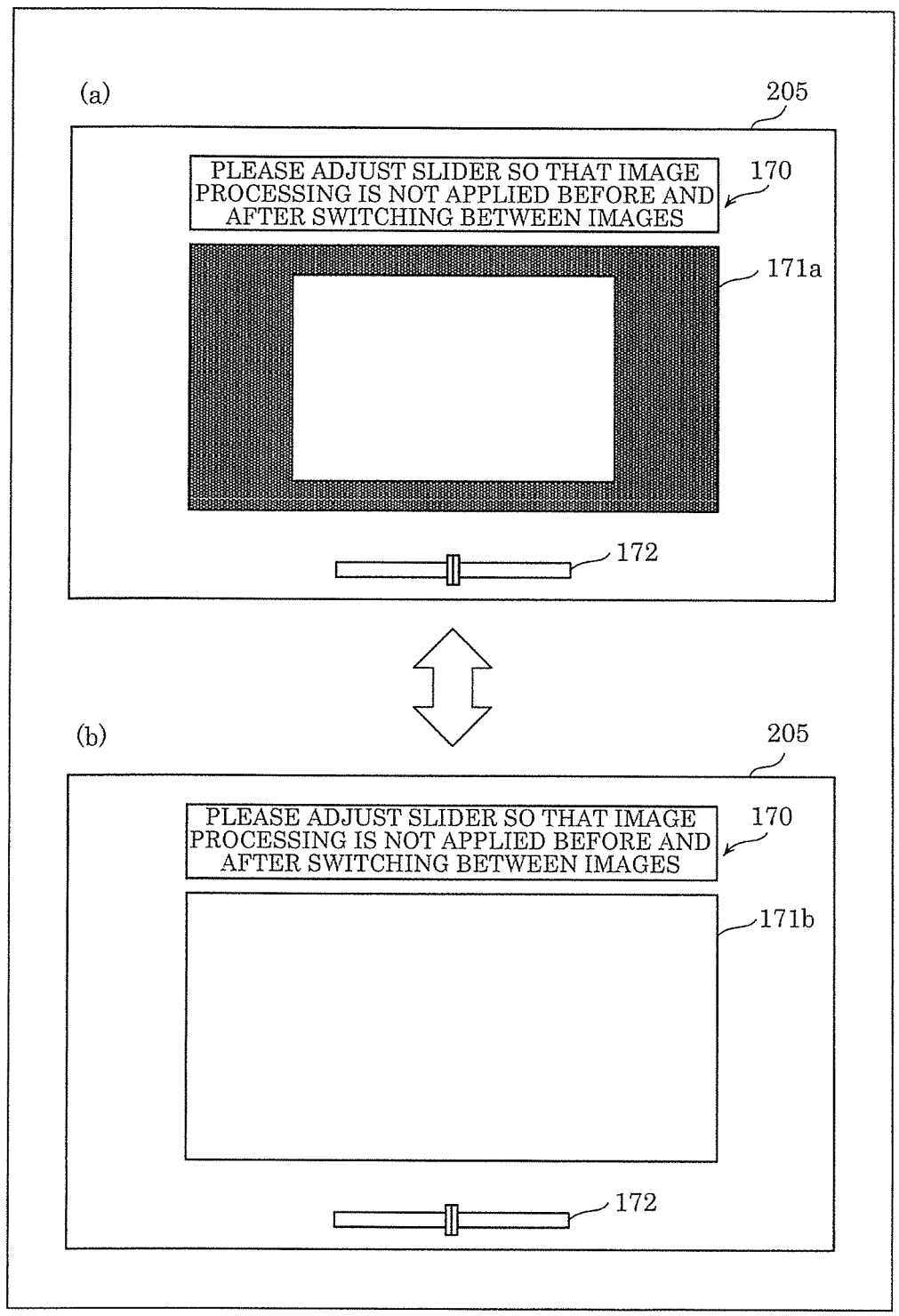
FIG. 7 is a diagram illustrating an example of a UI outputted by UI output unit.

UI output unit 140 outputs UI for identifying the first time difference to display device 200 by predetermined communication. Specifically, UI output unit 140 displays user interface (UI) 170 as illustrated in FIG. 7 on display panel 205 of display device 200. UI output unit 140 is implemented by control circuit 101, memory 102, and communication IF 106, for instance.

FIG. 7 is a diagram illustrating an example of a UI outputted by UI output unit.

As illustrated in (a) and (b) of FIG. 7, UI output unit 140 outputs UI 170 including images for adjustment 171a, 171b, and slider 172 on display device 200. In UI 170, image for adjustment 171a including a black area, and image for adjustment 171b not including a black area but including only a white area are displayed in a switching manner with a predetermined period. During output of UI 170, UI output unit 140 transmits pieces of image characteristic information in a switching manner, which correspond to image for adjustment 171a including a black area and image for adjustment 171b not including a black area but including only a white area. Thus, when display processing according to the image characteristic information corresponding to image for adjustment 171b is not performed in display device 200 at the timing of switching from image for adjustment 171a to image for adjustment 171b for performing display processing, display processing is applied at the timing shifted earlier or later from the switching between the images. Thus, UI 170 allows a user to adjust slider 172 so that image characteristic information is transmitted at appropriate timing. Slider 172 is adjusted by a user operating the remote controller of reproduction device 100A, for instance.

Returning to FIG. 6, input receiver 150 receives from a user predetermined input to UI 170 outputted by UI output unit 140, and UI output unit 140 outputs UI 170 including slider 172 with the position changed according to the predetermined input. In UI 170, in addition to slider 172, it is only necessary to display UI for adjusting at least one of transmission timing of pictures and transmission timing of image characteristic information. A box which receives a numerical value for adjusting the transmission timing may be displayed instead of slider 172. Input receiver 150 is implemented by input IF 107, for instance.

Determiner 160 determines the first time difference according to an input received by input receiver 150. Determining unit 160 determines a time difference corresponding to the position of slider 172 after adjustment as the first time difference, for instance. Determining unit 160 is implemented by control circuit 101, memory 102, for instance.

Display device 200A differs from display device 200 of Embodiment 1 in that display device 200A does not have storage unit 220.

Obtaining unit 110 obtains the first time difference determined by determining unit 160.

Figure 8:
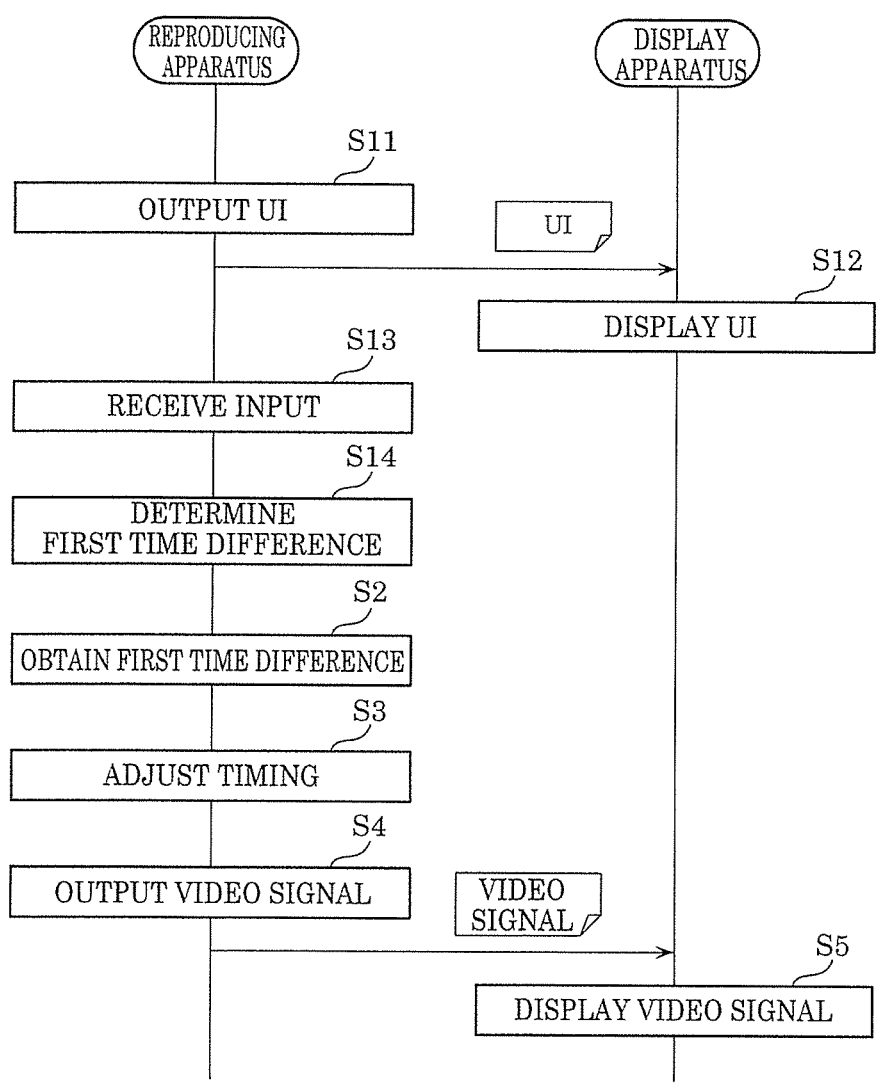
FIG. 8 is a sequence diagram illustrating an example of a reproduction method performed by the video display system according to Modification 1 of Embodiment 1.

FIG. 8 is a sequence diagram illustrating an example of a reproduction method performed by the video display system according to Modification 1 of Embodiment 1.

Modification 1 of Embodiment 1 differs from Embodiment 1 in that step S11 to step S14 are performed before step S2 to step S5 of Embodiment 1, thus step S11 to step S14 will be described, and a description of other steps is omitted.

First, in reproduction device 100A, UI output unit 140 outputs UI 170 to display device 200A via transmission cable 300 (S11).

Subsequently, display device 200A receives UI 170 via transmission cable 300, and displays the received UI 170 (S12).

Subsequently, in reproduction device 100A, input receiver 150 receives predetermined input to UI 170 from a user (S13).

Determining unit 160 then determines the first time difference according to the predetermined input received by input receiver 150 (S14).

Subsequently, the same processing as steps S2 to S5 described in Embodiment 1 is performed.

Like this, in video display system 1A according to Modification 1 of Embodiment 1, even when the first time difference in display device 200A is not obtainable from display device 200A, reproduction device 100A can estimate the first time difference in display device 200A according to input to UI 170 from a user. Thus, reproduction device 100A can output multiple pictures and multiple pieces of image characteristic information at the timing adjusted using the estimated first time difference. Therefore, display device 200A can obtain image characteristic information corresponding to the predetermined picture at the timing of the processing to display a predetermined picture of the video, and thus can perform appropriate display processing on the predetermined picture, the display processing corresponding to the image characteristics of the predetermined picture of the video.

[1-4-2. Modification 2]

Modification 2 of Embodiment 1 will be described.

In Modification 1 of Embodiment 1, an example has been described in which when display device 200 has not stored time difference information indicating the first time difference, reproduction device 100A outputs UI 170, and transmission timing is adjusted according to input to UI 170. However, an example of adjusting adjustment timing using UI is not limited to this. For instance, even when display device 200 has stored time difference information indicating the first time difference, reproduction device may adjust adjustment timing using UI.

Figure 9:
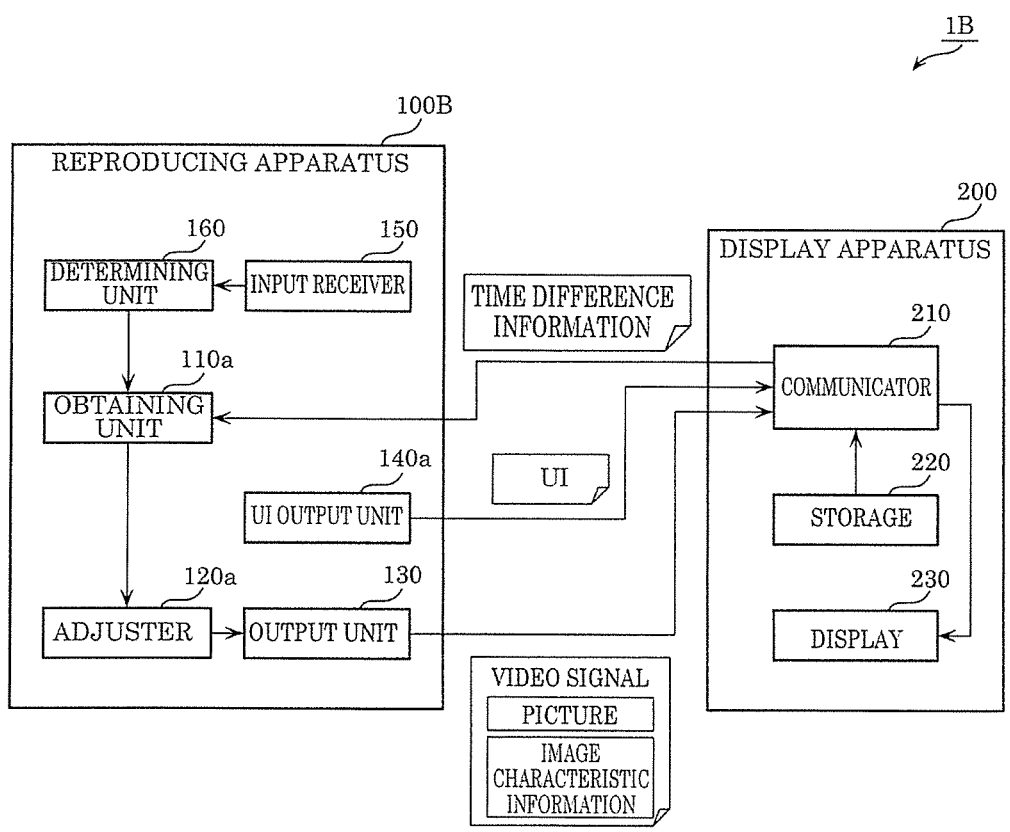
FIG. 9 is a block diagram illustrating an example of a functional configuration of the video display system according to Embodiment 1.

FIG. 9 is a block diagram illustrating an example of a functional configuration of the video display system according to Embodiment 1.

In video display system 1B according to Modification 2 of Embodiment 1, the functional configuration of reproduction device 100B is different from the functional configuration of reproduction device 100A according to Modification 1 of Embodiment 1. Display device 200 according to Modification 2 of Embodiment 1 has the same configuration as that of display device 200 according to Embodiment 1. Hereinafter, a different point from video display system 1A of Modification 1 of Embodiment 1 will be described, and a description of a common configuration is omitted. The hardware configuration of reproduction device 100B is the same as the hardware configuration of reproduction device 100 of Embodiment 1.

Reproduction device 100B differs from reproduction device 100A of Modification 1 of Embodiment 1 in the configuration of obtaining unit 110a, adjuster 120a, and UI output unit 140a.

Obtaining unit 110a obtains time difference information including the first time difference from display device 200. Obtaining unit 110a further obtains the second time difference from determining unit 160. Here, the second time difference refers to the time difference between the timing at which display device 200 displays the picture and the timing used by display device 200 to display image characteristic information corresponding to the picture, in the picture and the image characteristic information transmitted at the timing adjusted according to the first time difference. Obtaining unit 110a is implemented by control circuit 101, memory 102, communication IF 106, for instance.

Adjuster 120a adjusts at least one of the timing at which the multiple pictures are outputted and the timing at which the multiple pieces of image characteristic information are outputted, according to the first time difference and the second time difference indicated by the time difference information obtained by obtaining unit 110a.

UI output unit 140a outputs UI 170 at the timing adjusted according to the first time difference. Thus, after the first time difference is adjusted, input receiver 150 receives input from a user, the input indicating the second time difference that is the time difference between the timing at which display device 200 displays the picture and the timing used by display device 200 to display image characteristic information corresponding to the picture. Thus, determining unit 160 determines the second time difference according to the input.

Figure 10:
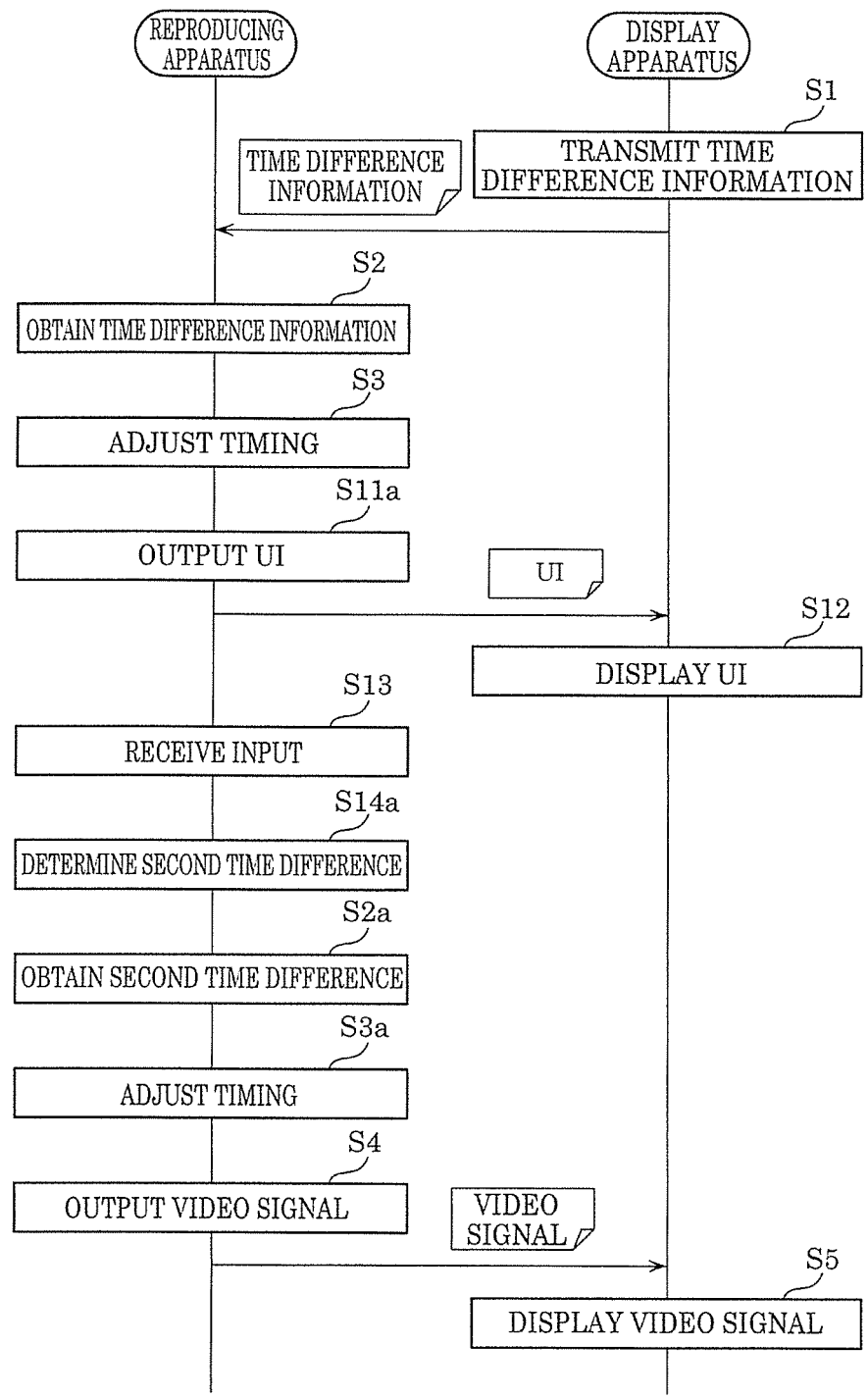
FIG. 10 is a sequence diagram illustrating an example of a reproduction method performed by a video display system according to Modification 2 of Embodiment 1.

FIG. 10 is a sequence diagram illustrating an example of a reproduction method performed by a video display system according to Modification 2 of Embodiment 1.

In Modification 2 of Embodiment 1, after step S1 to step S3 of Embodiment 1, UI 170 is outputted to determine the second time difference, and step S4 and step S5 of Embodiment 1 are performed according to the first time difference and the second time difference. Hereinafter, a description of the same steps as those described in Embodiment 1 or its Modifications may be omitted.

First, the same processing as steps S1 to S3 in Embodiment 1 is performed.

In reproduction device 100B, UI output unit 140a outputs UI 170 at the timing adjusted according to the first time difference (S11a). That is, UI output unit 140a outputs UI 170 for identifying the second time difference to display device 200 via transmission cable 300.

Subsequently, display device 200 displays UI 170 (S12), and receives input to UI 170 (S13).

In reproduction device 100B, determining unit 160 determines the second time difference according to the input (S14a).

Subsequently, obtaining unit 110a obtains the second time difference determined by determining unit 160 (S2a).

Subsequently, adjuster 120a adjusts at least one of the timing at which the multiple pictures are outputted and the timing at which the multiple pieces of image characteristic information are outputted, according to the first time difference and the second time difference indicated by the time difference information obtained by obtaining unit 110 (S3a).

Subsequently, the same processing as steps S4 and S5 described in Embodiment 1 is performed.

In this manner, in addition to the time difference information indicating the first time difference held by display device 200, reproduction device 100B uses UI 170 after adjustment of the first time difference to obtain the second time difference, and adjusts respective transmission timings for the pictures and the pieces of image characteristic information according to the first time difference and the second time difference. Thus, even after the adjustment of the first time difference, reproduction device can further adjust respective transmission timings for the pictures and the pieces of image characteristic information in consideration of the second time difference according to input to UI 170 from a user. Consequently, reproduction device can adjust the transmission timing which is accurate or suited to the preferences of a user.

Embodiment 2

In video display systems 1, 1A, 1B according to Embodiment 1 and Modifications 1, 2, reproduction devices 100, 100A, 100B adjust respective transmission timings for the pictures and the pieces of image characteristic information. However, the timing may be adjusted in the display device so that in conjunction the with display processing to display a picture, image characteristic information corresponding to the picture is applied.

Hereinafter, Embodiment 2 will be described using FIG. 11 and FIG. 12.

[2-1. Configuration]

Figure 11:
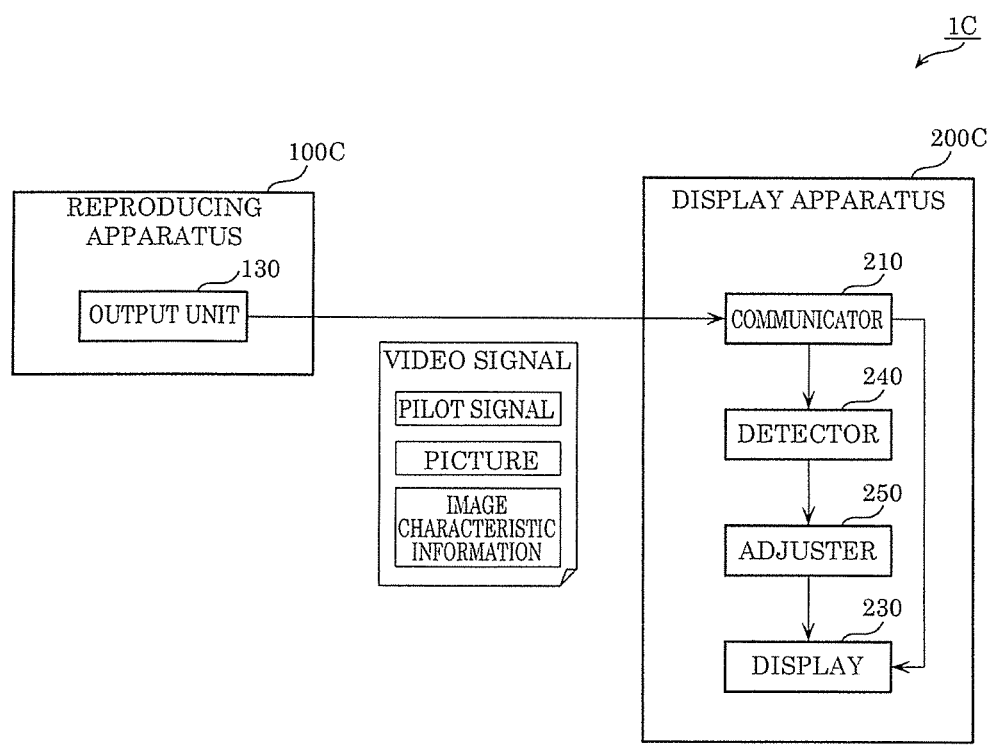
FIG. 11 is a block diagram illustrating an example of a functional configuration of a video display system according to Embodiment 2.

FIG. 11 is a block diagram illustrating an example of a functional configuration of a video display system according to Embodiment 2.

In video display system 10 according to Embodiment 2, the functional configuration of reproduction device 100C is different from the functional configuration of reproduction device 100 of Embodiment 1. The functional configuration of display device 2000 according to Embodiment 2 is also different from the functional configuration of display device 200 of Embodiment 1. It should be noted that the hardware configuration of reproduction device 100C is the same as the hardware configuration of reproduction device 100 of Embodiment 1, and the hardware configuration of display device 200C is the same as the hardware configuration of display device 200 of Embodiment 1.

Reproduction device 1000 differs from reproduction device 100 of Embodiment 1 in that reproduction device 100C does not have obtaining unit 110 and adjuster 120. In reproduction device 100C, output unit 130 transmits a video signal to display device 200C via transmission cable 300. Although output unit 130 outputs a video signal similarly to Embodiment 1, a video signal reproduced in Embodiment 2 includes, for instance, a pilot signal prior to video signals indicating the content image. As long as video data obtained by reproduction device 100C includes pilot data indicating a pilot signal, the configuration of reproduction device 100C may be the same as the configuration of reproduction device 100 of Embodiment 1. In contrast to reproduction device 100 of Embodiment 1, reproduction device 100C may have a storage unit that has stored a pilot signal in advance.

Display device 200C differs from display device 200 of Embodiment 1 in that display device 200C has no storage unit 220, but has detector 240 and adjuster 250.

Communication unit 210 receives a video signal including a pilot signal from reproduction device 100C, thereby also serving as an obtaining unit that obtains a video signal. A video signal is received from reproduction device 100C via transmission cable 300, the video signal including a video having multiple pictures and multiple pieces of image characteristic information corresponding to the multiple pictures and representing respective image characteristics of the multiple pictures. Communication unit 210 is implemented by control circuit 201, memory 202, communication IF 203, for instance.

Detector 240 detects a third time difference between a third timing when reproduction device 100C outputs one of the multiple pictures and a fourth timing when reproduction device 100C outputs one picture among the multiple pieces of image characteristic information corresponding to the one picture. Specifically, detector 240 obtains a pilot picture for testing included in a pilot signal reproduced by reproduction device 100C and pilot image characteristic information corresponding to the pilot picture, Detector 240 detects the third time difference using the timing at which the pilot picture is obtained and the timing at which pilot image characteristic information is obtained. The pilot signal includes, for instance, one pilot picture showing a black screen and one piece of pilot image characteristic information corresponding to the one pilot picture. Thus, detector 240 can detect the third time difference when obtaining a video signal including the pilot signal. In other words, even when multiple pictures and multiple pieces of image characteristic information are received, the correspondence relationship therebetween is unknown, and thus it is not easy to detect the third time difference. However, the pilot signal provides clear correspondence relationship, thus the third time difference can be easily detected. The third time difference is the time difference obtained by subtracting the fourth timing from the third timing, for instance. That is, when the third timing is a time earlier than the fourth timing, the third time difference is a positive value, and conversely, when the third timing is time later than the fourth timing, the third time difference is a negative value. Detector 240 is implemented by control circuit 201, memory 202, for instance.

It should be noted that the third time difference may be the time difference obtained by subtracting the third timing from the fourth timing. In this case, the relationship between the positive and negative values is reversed.

Adjuster 250 adjusts at least one of the timing at which the multiple pictures are displayed and the timing used to display the multiple pieces of image characteristic information according to the third time difference detected by detector 240 to reduce the third time difference. Specifically, when the third time difference is a positive value, adjuster 120 delays the timing at which multiple pictures are displayed by the third time difference, or advances the timing used for processing to display multiple pieces of image characteristic information by the third time difference, or delays the timing at which multiple pictures are displayed and advances the timing used for processing to display multiple pieces of image characteristic information by the third time difference. When the third time difference is a negative value, adjuster 120 advances the timing at which multiple pictures are displayed by the third time difference, or delays the timing used for processing to display multiple pieces of image characteristic information by the third time difference, or advances the timing at which multiple pictures are displayed and delays the timing used for processing to display multiple pieces of image characteristic information by the third time difference. Adjuster 250 may adjust the timing in terms of unit of a display interval (display period) of continuously displayed multiple pictures. Adjuster 250 is implemented by control circuit 201, memory 202, for instance.

Display 230 displays multiple pictures using multiple pieces of image characteristic information at the timing adjusted by adjuster 250. The display is implemented by video processing circuit 204 and display panel 205, for instance.

[2-2. Operation]

Figure 12:
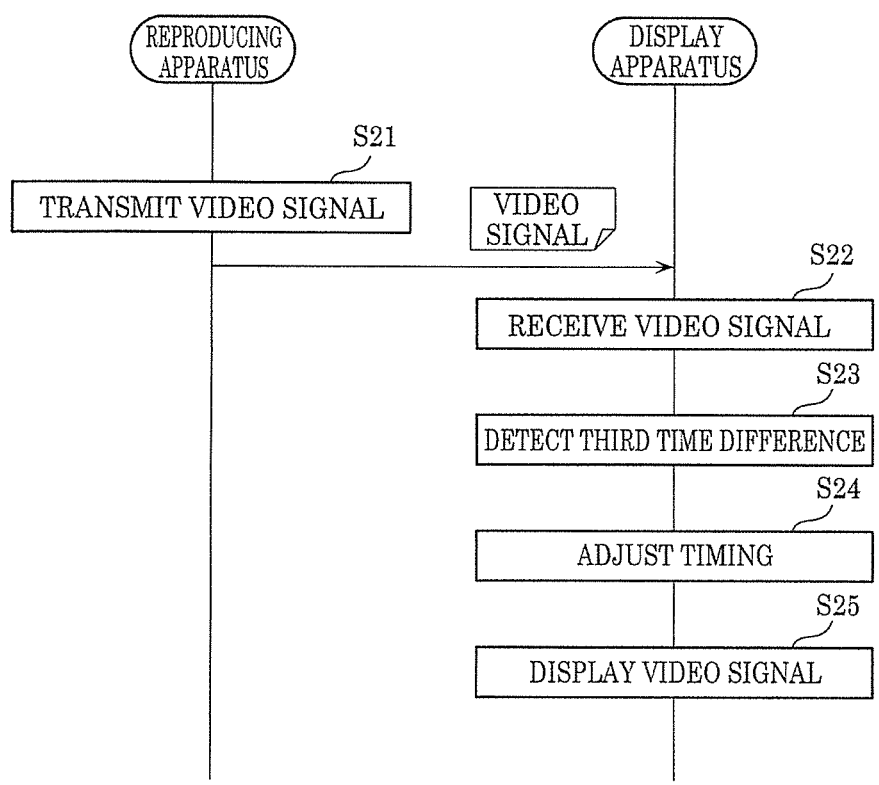
FIG. 12 is a sequence diagram illustrating an example of a display method performed by the video display system according to Embodiment 2.

FIG. 12 is a sequence diagram illustrating an example of a display method performed by the video display system according to Embodiment 2.

First, in reproduction device 100C, output unit 130 transmits a video signal including a pilot signal to display device 200C via transmission cable 300 (S21).

Subsequently, in display device 200C, communicator 210 receives the video signal including a pilot signal (S22).

Detector 240 detects the third time difference from the pilot signal included in the video signal received by communicator 210 (S23).

Subsequently, adjuster 250 adjusts at least one of the timing at which the multiple pictures are displayed and the timing used for processing to display the multiple pieces of image characteristic information to reduce the third time difference detected by detector 240 (S24).

Then display 230 displays multiple pictures using multiple pieces of image characteristic information at the timing adjusted by adjuster 250 (S25).

[2-3. Effects]

As described above, display device 200C includes communicator 210, detector 240, adjuster 250, and display 230 in the present embodiment. Communicator 210 obtains a video signal from the reproduction device by predetermined communication, the video signal including a video having multiple pictures and multiple pieces of image characteristic information corresponding to the multiple pictures and representing respective image characteristics of the multiple pictures. Detector 240 detects a third time difference between the timing when reproduction device 100C outputs one picture among the multiple pictures and the timing when reproduction device 100C outputs one of the multiple pieces of image characteristic information corresponding to the one picture. Adjuster 250 adjusts at least one of the timing at which the multiple pictures are displayed and the timing used to display the multiple pieces of image characteristic information according to the third time difference detected by detector 240 to reduce the third time difference. Display 230 displays multiple pictures using multiple pieces of image characteristic information at the timing adjusted by adjuster 250.

According to this, display device 200C adjusts at least one of the timing at which the multiple pictures are displayed and the timing used to display the multiple pieces of image characteristic information in order to reduce the third time difference between the timing of outputting a picture obtained by reproducing video data by reproduction device 100C, and the timing of outputting one piece of image characteristic information corresponding to the picture by reproduction device 100C. Display device 200C displays the multiple pictures obtained at the adjusted timing using the multiple pieces of image characteristic information obtained at the adjusted timing. Therefore, display device 200C can obtain image characteristic information corresponding to the predetermined picture at the timing of the processing to display a predetermined picture of the video, and thus can perform appropriate display processing on the predetermined picture, the display processing corresponding to the image characteristics of the predetermined picture of the video. In other words, display device 200C sequentially performs display processing using the obtained image characteristic information on a picture obtained at the adjusted timing, thus even when each picture is not associated with image characteristic information, display device 200C can perform display processing using image characteristic information in corresponding relationship.

[2-4. Modification]

A modification of Embodiment 2 will be described.

In Embodiment 2 described above, reproduction device 100C transmits a video signal including a pilot signal, thereby causing display device 200C to detect the third time difference. However, without being limited to this, time difference information indicating the third time difference may be transmitted to display device 200C.

In this case, reproduction device 100C adds time difference information to InfoFrame transmitted via HDMI, and transmits the time difference information to display device 200C. Thus, display device 200C obtains the third time difference included in InfoFrame received via transmission cable 300. Subsequently, display device 200C may perform processing using the obtained third time difference.

Therefore, display device 200C can obtain the third time difference only by connecting to reproduction device 100C via the HDMI.

In the embodiments, each component may be implemented by dedicated hardware, or by executing a software program suitable for each component. Each component may be implemented by a program executor, such as a CPU or a processor, reading and executing a software program recorded on a recording medium such as a hard disk or a semiconductor memory.

Here, software which implements the reproduction method of the embodiments is the following program.

Specifically, the program causes a computer to execute a reproduction method in a reproduction device that outputs a video signal to a display device by predetermined communication, the video signal including a plurality of pictures and a plurality of pieces of image characteristic information each representing an image characteristic of a corresponding one of the plurality of pictures, the reproduction method comprising: obtaining a first time difference between a time when the display device displays one picture among the plurality of pictures and a time used by the display device to display one of the plurality of pieces of image characteristic information corresponding to the one picture; adjusting at least one of a time at which the plurality of pictures are outputted and a time at which the plurality of pieces of image characteristic information are outputted according to the first time difference obtained to reduce the first time difference; and outputting the plurality of pictures and the plurality of pieces of image characteristic information by the predetermined communication at the time adjusted.

Here, software which implements the display method of the embodiments is the following program.

Specifically, the program causes a computer to execute a display method including: obtaining a video signal from a reproduction device by predetermined communication, the video signal including a plurality of pictures and a plurality of pieces of image characteristic information each representing an image characteristic of a corresponding one of the plurality of pictures; detecting a third time difference between a time when the reproduction device outputs one of the plurality of pictures and a time when the reproduction device outputs one picture among the plurality of pieces of image characteristic information corresponding to the one picture; adjusting at least one of a time at which the plurality of pictures are displayed and a time used to display the plurality of pieces of image characteristic information according to the third time difference detected to reduce the third time difference is reduced; and displaying the plurality of pictures using the one image characteristic information at the time adjusted.

As described above, the embodiments have been described as illustration of the technique in the present disclosure. For this purpose, the accompanying drawings and detailed description have been provided.

Thus, the components illustrated in the accompanying drawings and detailed description may include not only the components required for the solution to the problem, but also the components not required for the solution to the problem in order to illustrate the technique. Therefore, even when those non-required components are illustrated in the accompanying drawings and detailed description, it should not be understood immediately that those non-required components are required.

Since the embodiments described above are provided to illustrate the technique in the present disclosure, various changes, substitutions, additions, and omissions may be made within the scope of the claims and the scope of the equivalents thereof.

INDUSTRIAL APPLICABILITY

The present disclosure is applicable to a reproduction device, a reproduction method, a display device, and a display method that are capable of performing appropriate image processing on a predetermined picture in a video, the image processing corresponding to the image characteristics of the predetermined picture.

The invention claimed is:

1. A reproduction device that outputs a video signal to a display device via predetermined communication, the video signal including a video having a plurality of pictures and a plurality of items of dynamic metadata each representing a luminance characteristic of a corresponding one of the plurality of pictures, the reproduction device comprising:
   an obtaining unit that obtains a first time difference between a timing at which the display device displays one picture among the plurality of pictures and a timing used by the display device to perform processing for displaying one of the plurality of items of dynamic metadata corresponding to the one picture, the processing for displaying is processing of adjusting luminance of the plurality of pictures using the one of the plurality of items of dynamic metadata and displaying a luminance-adjusted picture;
   an adjuster that adjusts at least one of a timing at which the plurality of pictures are outputted and a timing at which the plurality of items of dynamic metadata are outputted to reduce the first time difference obtained by the obtaining unit; and
   an output unit that outputs the plurality of pictures and the plurality of items of dynamic metadata via the predetermined communication at the timing adjusted by the adjuster.

2. The reproduction device according to claim 1, further comprising:
   a user interface (UI) output unit that outputs a UI for identifying the first time difference to the display device via the predetermined communication;
   an input receiver that receives predetermined input from a user to the UI outputted by the UI output unit; and
   a determining unit that determines the first time difference according to the predetermined input received by the input receiver,
   wherein the obtaining unit obtains the first time difference determined by the determining unit, and
   the UI output unit:
      (i) outputs, as the UI, a UI which causes the display device to display a first image for adjustment including a black area and a second image for adjustment not including a black area but including only a white area in a switching manner with a predetermined period; and
      (ii) transmits, while the UI is being output, items of dynamic metadata corresponding to the first image for adjustment and the second image for adjustment in a switching manner.

3. The reproduction device according to claim 1, further comprising:
   a user interface (UI) output unit that outputs a UI for identifying a second time difference to the display device via the predetermined communication;
   an input receiver that receives a predetermined input from a user to the UI outputted by the UI output unit; and
   a determining unit that determines the second time difference according to the predetermined input received by the input receiver,
   wherein the adjuster adjusts at least one of the timing at which the plurality of pictures are outputted and the timing at which the plurality of items of dynamic metadata are outputted according to the first time difference obtained by the obtaining unit and the second time difference determined by the determining unit to reduce a total value of the first time difference and the second time difference, and
   the UI output unit:
      (i) outputs, as the UI, a UI which causes the display device to display a first image for adjustment including a black area and a second image for adjustment not including a black area but including only a white area in a switching manner with a predetermined period; and
      (ii) transmits, while the UI is being output, items of dynamic metadata corresponding to the first image for adjustment and the second image for adjustment in a switching manner.

4. The reproduction device according to claim 1,
   wherein the predetermined communication is communication via High-Definition Multimedia Interface (HDMI) (registered trademark), and
   the obtaining unit obtains Extended Display Identification Data (EDID) of the display device via the HDMI, and obtains the first time difference included in the EDID.

5. The reproduction device according to claim 1,
   wherein the plurality of items of dynamic metadata includes at least one of a maximum luminance and an average luminance of the plurality of pictures.

6. A reproduction method performed by a reproduction device that outputs a video signal to a display device via predetermined communication, the video signal including a plurality of pictures and a plurality of items of dynamic metadata each representing a luminance characteristic of a corresponding one of the plurality of pictures, the reproduction method comprising:
   obtaining a first time difference between a timing at which the display device displays one picture among the plurality of pictures and a timing used by the display device to display to perform processing for displaying one of the plurality of items of dynamic metadata corresponding to the one picture, the processing for displaying is processing of adjusting luminance of the plurality of pictures using the one of the plurality of items of dynamic metadata and displaying a luminance-adjusted picture;
   adjusting at least one of a timing at which the plurality of pictures are outputted and a timing at which the plurality of items of dynamic metadata are outputted according to the first time difference obtained to reduce the first time difference; and
   outputting the plurality of pictures and the plurality of items of dynamic metadata via the predetermined communication at the timing adjusted.

7. A display device comprising:
   an obtaining unit that obtains a video signal from a reproduction device via predetermined communication, the video signal including a video having a plurality of pictures and a plurality of items of dynamic metadata each representing a luminance characteristic of a corresponding one of the plurality of pictures;

a detector that detects a third time difference between a timing at which the reproduction device outputs one picture among the plurality of pictures and a timing at which the reproduction device outputs one of the plurality of items of dynamic metadata corresponding to the one picture;

an adjuster that adjusts at least one of a timing at which the plurality of pictures are displayed and a timing used to perform processing for displaying the plurality of items of dynamic metadata according to the third time difference detected by the detector to reduce the third time difference; and a display that adjusts, for each of the plurality of pictures, luminance of the picture using an item of dynamic metadata corresponding to the picture, and displays a luminance-adjusted picture at the timing adjusted by the adjuster.

8. The display device according to claim 7, wherein the detector obtains a pilot picture for testing and pilot image characteristic information corresponding to the pilot picture, which have been reproduced by the reproduction device, and detects the third time difference using a timing at which the pilot picture is obtained and a timing at which the pilot image characteristic information is obtained.

9. The display device according to claim 7, wherein the predetermined communication is communication via High-Definition Multimedia Interface (HDMI), and the obtaining unit obtains InfoFrame transmitted from the reproduction device via the HDMI, and obtains the third time difference included in the InfoFrame.

10. The display device according to claim 7, wherein the plurality of items of dynamic metadata includes at least one of a maximum luminance and an average luminance of the plurality of pictures.

11. A display method comprising:

obtaining a video signal from a reproduction device via predetermined communication, the video signal including a plurality of pictures and a plurality of items of dynamic metadata each representing a luminance characteristic of a corresponding one of the plurality of pictures;

detecting a third time difference between a timing at which the reproduction device outputs one picture among the plurality of pictures and a timing at which the reproduction device outputs one of the plurality of items of dynamic metadata corresponding to the one picture;

adjusting at least one of a timing at which the plurality of pictures are displayed and a timing used to perform processing for displaying the plurality of items of dynamic metadata according to the third time difference detected to reduce the third time difference; and adjusting, for each of the plurality of pictures, luminance of the picture using an item of dynamic metadata corresponding to the picture, and displays a luminance-adjusted picture at the timing adjusted.

* * * * *